(12) United States Patent
Lesuffleur et al.

(10) Patent No.: US 12,398,067 B2
(45) Date of Patent: Aug. 26, 2025

(54) DECORATED GLASS HAVING A PRINTED INK LAYER

(71) Applicant: Corning Incorporated, Corning, NY (US)

(72) Inventors: Antoine Daniel Emmanuel Lesuffleur, Avon (FR); Xu Ouyang, Painted Post, NY (US); Yawei Sun, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 995 days.

(21) Appl. No.: 17/599,950

(22) PCT Filed: Mar. 27, 2020

(86) PCT No.: PCT/US2020/025223
§ 371 (c)(1),
(2) Date: Sep. 29, 2021

(87) PCT Pub. No.: WO2020/205519
PCT Pub. Date: Oct. 8, 2020

(65) Prior Publication Data
US 2022/0194845 A1     Jun. 23, 2022

Related U.S. Application Data

(60) Provisional application No. 62/987,563, filed on Mar. 10, 2020, provisional application No. 62/829,347, filed on Apr. 4, 2019.

(51) Int. Cl.
*B32B 15/04*     (2006.01)
*B32B 17/06*     (2006.01)
(Continued)

(52) U.S. Cl.
CPC .............. *C03C 17/22* (2013.01); *C03C 3/078* (2013.01); *C03C 3/083* (2013.01); *C03C 3/089* (2013.01);
(Continued)

(58) Field of Classification Search
CPC ..................................... C09D 11/037
(Continued)

(56) References Cited

U.S. PATENT DOCUMENTS 12,235,477 B2 *   2/2025   Lesuffleur ............... G02B 5/205
2012/0218640 A1 *  8/2012   Gollier .................... C03C 15/00
                                                            359/601
(Continued)

FOREIGN PATENT DOCUMENTS

CN     104718071 A     6/2015
CN     105693109 A     6/2016
(Continued)

OTHER PUBLICATIONS

Korean Patent Application No. 10-2021-7035648, Notice of Allowance dated Jan. 7, 2025, 3 pages (English Translation only), Korean Patent Office.
(Continued)

*Primary Examiner* — Lauren R Colgan
(74) *Attorney, Agent, or Firm* — William M. Johnson; Payal A. Patel

(57) ABSTRACT

Embodiments of a decorated glass are provided. The decorated glass includes a transparent substrate having a first major surface and a second major surface. The second major surface is opposite the first major surface. The decorated glass also includes a black ink layer disposed on the second major surface in a display region. The black ink layer has a transmission coefficient of between 0.2 and 0.85 with respect to incident light having a wavelength of 400 nm to
(Continued)

700 nm. The decorated glass has 2% or less of sparkle when measured from the first major surface via pixel power deviation reference (PPDr).

19 Claims, 5 Drawing Sheets

(51) Int. Cl.
*C03C 3/078* (2006.01)
*C03C 3/083* (2006.01)
*C03C 3/089* (2006.01)
*C03C 3/091* (2006.01)
*C03C 17/22* (2006.01)
*C09D 11/037* (2014.01)
*C03C 21/00* (2006.01)

(52) U.S. Cl.
CPC ............ *C03C 3/091* (2013.01); *C09D 11/037* (2013.01); *C03C 21/002* (2013.01); *C03C 2217/72* (2013.01); *C03C 2217/73* (2013.01); *C03C 2218/119* (2013.01)

(58) Field of Classification Search
USPC ....................................................... 428/426
See application file for complete search history.

(56) References Cited

U.S. PATENT DOCUMENTS

| | | | |
|---|---|---|---|
| 2012/0300304 A1* | 11/2012 | Gollier | C03C 15/00 359/599 |
| 2013/0107370 A1* | 5/2013 | Lander | C03C 3/087 359/609 |
| 2016/0169531 A1 | 6/2016 | Wagner et al. | |
| 2017/0075039 A1 | 3/2017 | Hart et al. | |
| 2017/0341345 A1* | 11/2017 | Loccufier | B32B 17/10302 |
| 2018/0215657 A1* | 8/2018 | Jin | C03C 19/00 |
| 2019/0235304 A1* | 8/2019 | Tamada | G02B 5/0221 |
| 2019/0248098 A1 | 8/2019 | Ozeki et al. | |
| 2021/0034100 A1* | 2/2021 | Lesuffleur | B60K 35/60 |

FOREIGN PATENT DOCUMENTS

| | | |
|---|---|---|
| CN | 105705330 A | 6/2016 |
| CN | 213266287 U | 5/2021 |
| DE | 102016006834 A1 | 12/2016 |
| WO | 2017/184678 A1 | 10/2017 |
| WO | 2018/212145 A1 | 11/2018 |
| WO | 2019/055458 A1 | 3/2019 |

OTHER PUBLICATIONS

Chinese Patent Application No. 202080033703.8, Office Action dated Feb. 13, 2023, 4 pages (English Translation only), Chinese Patent Office.
International Search Report and Written Opinion of the International Searching Authority; PCT/US20/25223; Mailed Jul. 3, 2020; 9 Pages; European Patent Office.

* cited by examiner

DECORATED GLASS HAVING A PRINTED INK LAYER

CROSS-REFERENCE TO RELATED APPLICATIONS

This application is a national stage application under 35 U.S.C. § 371 of International Application No. PCT/US2020/025223, filed on Mar. 27, 2020, which claims the benefit of priority under 35 U.S.C. § 119 of U.S. Provisional Application Ser. No. 62/987,563 filed on Mar. 10, 2020 and U.S. Provisional Application Ser. No. 62/829,347 filed on Apr. 4, 2019, the contents of which are relied upon and incorporated herein by reference in their entirety.

BACKGROUND

The disclosure relates to a decorated glass, and more particularly to a glass having an ink layer to provide color matching or deadfronting with low sparkle.

SUMMARY

In one aspect, embodiments of the disclosure relate to a decorated glass. The decorated glass includes a transparent substrate having a first major surface and a second major surface. The second major surface is opposite the first major surface. The decorated glass also includes a black ink layer disposed on the second major surface in a display region. The black ink layer has a transmission coefficient of between 0.2 and 0.85 with respect to incident light having a wavelength of 400 nm to 700 nm. The decorated glass has 2% or less of sparkle when measured from the first major surface via pixel power deviation reference (PPDr).

In another aspect, embodiments of the disclosure relate to a method of preparing a decorated glass. In one or more embodiments of the method, a transparent substrate is provided that has a first major surface and a second major surface in which the second major surface is opposite to the first major surface. An ink layer is printed on the second major surface of the transparent substrate in at least one display region. The ink layer has an a* and b* of no more than 5 and an L* of no more than 50 according to the CIE L*a*b* color space. Further, the ink layer has a transmission coefficient of between 0.2 and 0.85 with respect to incident light having a wavelength of 400 nm to 700 nm, and the ink layer has 2% or less sparkle when measured via pixel power deviation reference (PPDr).

In another aspect, embodiments of the disclosure relates to a device. The device includes a decorated glass and a light source. The decorated glass has a first side and a second side with the second side being opposite the first side. Further, the decorated glass includes a transparent substrate having a first major surface and a second major surface with the second major surface being opposite the first major surface. The decorated glass also includes a black ink layer disposed on the second major surface in at least one display region. The ink layer has a transmission coefficient of between 0.2 and 0.85 with respect to incident light having a wavelength of 400 nm to 700 nm. The light source is disposed on the second side of the decorated glass, and 2% or less of sparkle is measured from the first side of the decorated glass via pixel power deviation reference (PPDr).

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a decorated glass with an ink layer are provided. In embodiments, the decorated glass may be a cover glass that provides color matching or deadfronting for a display, or in embodiments, the decorated glass may be a window, door, or other architectural panel that obscures a view through the decorated glass from a side of the decorated glass upon which ambient light is incident. Referring to the cover glass embodiment, a decorated glass may be placed over a light source, such as a display, to hide or diminish the visibility of a display when the display is off. A color matching decorated cover glass will not completely hide a display when the display is off, but it obscures the display to make it less prominent. A deadfront decorated cover glass is designed to completely hide the display when the display is off. Both of a color matching decorated cover glass and a deadfront decorated cover glass are designed to allow the display to be visible when the display is on. In general, the difference between a color matching decorated cover glass and a deadfront decorated cover glass is the level of transparency of the color matching or deadfronting layer on the decorated glass. In the present disclosure, the color matching or deadfronting layer is an ink layer printed on the decorated glass. However, depending on the ink used and how it is applied, there may be unsmooth coverage, surface tension fluctuations, particles, etc. that allow light reflected from the display to leak through the ink layer. According to the present disclosure, the ink layer is applied such that the sparkle caused by this light leakage is less than 2% as measured by pixel power deviation reference (PPDr). Embodiments of the decorated glass discussed herein are provided by way of example and not by way of limitation.

Figure 1:
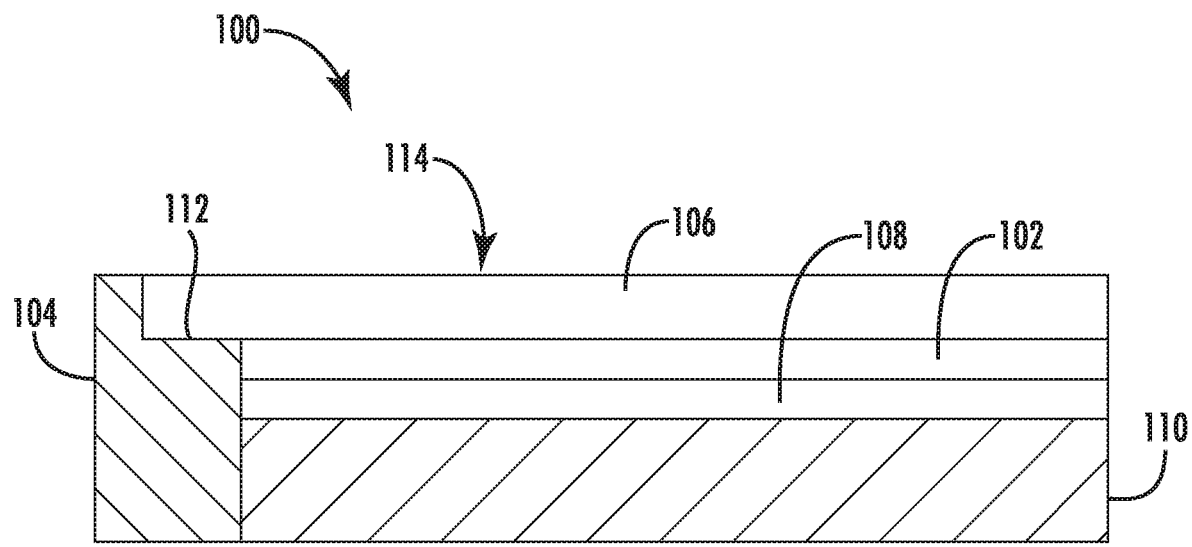
FIG. 1 depicts a partial cross-sectional view of an electronic device, according to an exemplary embodiment.

FIG. 1 is a partial cross-sectional view of an electronic device 100 including a touch interface 102. In embodiments, the electronic device 100 is a standalone device, such as a laptop computer, a tablet computer, a smart-phone, a digital music player, portable gaming station, a television, etc. That is, a "standalone electronic device" 100 is primarily a display screen or interactive panel not incorporated into another structure, device, or apparatus. In other embodiments, the electronic device 100 is incorporated into another structure, device, or apparatus. For example, the electronic device 100 may be a control panel, e.g., in a vehicle, on an appliance, for an elevator, etc., that allows for interaction with the structure, device, or apparatus.

In the embodiment depicted in FIG. 1, the electronic device 100 includes the touch interface 102, a housing 104, a decorated glass 106, a light source (e.g., display unit 108), and a circuit board 110. The housing 104 at least partially surrounds the touch interface 102, and in the embodiment depicted, provides a seating surface 112 for the decorated glass 106. Thus, in the embodiment depicted, the decorated glass 106 operates as a cover glass for the display unit 108. Further, in a standalone device, the housing 104 may provide the boundaries of the electronic device 100, whereas when the electronic device 100 is incorporated into another structure, device, or apparatus, the housing 104 may just provide a mount for the electronic device 100 within the larger overall structure, device, or apparatus. In either configuration, the decorated glass 106 covers at least a portion of the touch interface 102 and may be seated into the housing 104 to as to provide a substantially planar viewing surface 114. The circuit board 110 supplies power to the touch interface 102 and to the display unit 108 and processes inputs from the touch interface 102 to produce a corresponding response on the display unit 108.

The touch interface 102 may include one or more touch sensors in order to detect one or more touch or capacitive inputs, such as due to the placement of a user's finger, stylus, or other interaction device close to or on the decorated glass 106. The touch interface 102 may generally be any type of interface configured to detect changes in capacitance or other electrical parameters that may be correlated to a user input. The touch interface 102 may be operably connected to and/or in communication the circuit board 110. The touch interface 102 is configured to receive inputs from an object (e.g., location information based on a user's finger or data from the input device). The display unit 108 is configured to display one or more output images, graphics, icons, and/or videos for the electronic device 100. The display unit 108 may be substantially any type of display mechanism, such as an light emitting diode (LED) display, an organic LED (OLED) display, a liquid crystal display (LCD), plasma display, or the like.

As mentioned above, the display unit 108 has an internal reflectivity based on the construction of the display unit 108. For example, a direct-lit backlight LCD display unit 108 may contain several layers in front of the light source, such as a polarizers, glass layers, thin film transistor, liquid crystal, color filter, etc. that internally reflect some of the light incident upon the decorated glass. As also mentioned above, this light may leak through a cover matching or deadfront decorated glass 106 if the color matching or deadfronting layer contains defects.

As mentioned, in other embodiments, the decorated glass 106 may be a window, door, or other architectural, structural, or decorative panel. For example, the decorated glass 106 may be the window of a vehicle or of a building. In such embodiments, the decorated glass 106 may provide privacy or shading for people or objects on the opposite side of the decorated glass 106 from an ambient light source. Additionally, the decorated glass 106 can be a panel in a vehicle, such as a dashboard panel, arm rest, or center console panel. In such embodiments, the decorated glass 106 may hide, e.g., wires and structural components of the vehicle and provide an overall decorative surface.

Figure 2:
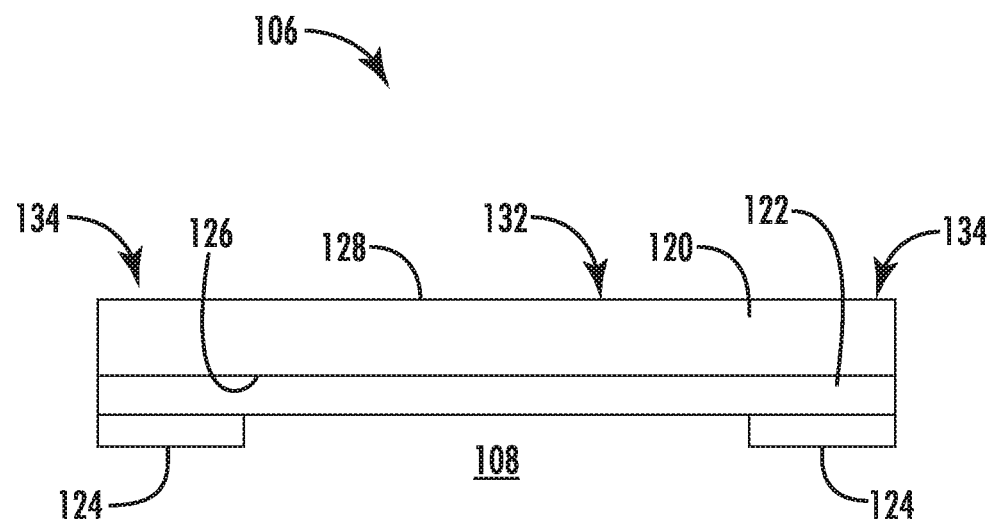
FIG. 2 depicts a cross-sectional view of the layers of a decorated glass, according to an exemplary embodiment.

Having described the general structure of an exemplary electronic device 100, the structure of the decorated glass 106 is now described. As can be seen in FIG. 2, the decorated glass 106 includes a substrate 120, a black ink layer 122, and optionally an opaque mask layer 124 (e.g., when used as a cover glass). In embodiments, the substrate 120 is a transparent glass. For example, suitable glass substrates 120 may include at least one of silicates, borosilicates, aluminosilicates, aluminoborosilicates, alkali aluminosilicates, and alkaline earth aluminosilicates, among others. Such glasses may be chemically or thermally strengthened, and embodiments of such glasses are provided below. In embodiments, the substrate 120 has a thickness (i.e., distance between a first major surface 126 and a second major surface 128) of no more than about 2 mm, no more than about 0.8 mm, or no more than about 0.55 mm.

In embodiments, the black ink layer 122 and the opaque mask layer 124 are applied to the glass substrate 120 in such a way as to define a display region 130 and a non-display region 132. In particular, portions of the decorated glass 106 that include the opaque mask layer 124 define the non-display region 132, and regions containing only the black ink layer 122 define the display region 130. The black ink layer 122 is applied to the first major surface 126 of the glass substrate 120 in display regions 130. In embodiments that do not include an opaque mask layer 124, the entire decorated glass 106 is a display region 130. In non-display regions 132, the opaque mask layer 124 may be applied to the first major surface 126 or over the black ink layer 122. For example, a black ink layer 122 may be applied over all or a substantial portion of the first major surface 126, and the opaque mask layer 124 may be applied over the black ink layer 122 to define the non-display regions 132. In an alternative example, the opaque mask layer 124 may be applied first to the first major surface 126 to create the non-display regions 132, and the black ink layer 122 may be applied only in the display regions 130 (i.e., where there is no opaque mask layer 124) or over all or a portion of the opaque mask layer 124.

In order to provide the color matching or deadfront effect, the black ink layer 122 in the display regions 130 has a transmission coefficient of 0.2 to 0.85 for light incident on the second major surface 128 of the substrate 120. That is, the black ink layer 122 transmits between 20% and 85% of light in the visible spectrum (i.e., light having a wavelength of 400 nm to 700 nm) that is incident upon the second major surface 128. That is, the black ink layer 122 has a transmission coefficient of 0.2 to 0.85. In other embodiments, the black ink layer 122 has a transmission coefficient of 0.2 to 0.8, and in still other embodiments, the black ink layer 122 has a transmission coefficient of 0.2 to 0.75. In embodiments, the black ink layer 122 will provide a color matching effect if the transmission coefficient is from 0.5 to 0.85. In embodiments, the black ink layer 122 will provide a deadfront effect if the transmission coefficient is from 0.2 to 0.7. As can be seen, there is an overlap between the transmission coefficient for color matching and deadfronting because the visibility of an object behind the decorated glass 106 depends on certain characterisitics of the object, such as the reflectivity of the object. Thus, an object the reflects less light may achieve a deadfront effect at a higher transmission coefficient, whereas an object that reflects more light may require a lower transmission coefficient just to achieve color matching.

In embodiments, the black ink layer 122 is printed onto the first major surface 126 (or opaque mask layer 124). In embodiments, the black ink layer 122 is printed via inkjet printing, slot printing, screen printing, pad printing, or gravure printing, among others. In embodiments, the black ink layer 122 is has a thickness of no more than 50 µm. In other embodiments, the black ink layer 122 has a thickness of no more than 30 µm, and in still other embodiments, the black ink layer 122 has a thickness of no more than 20 µm. In embodiments, the black ink layer 122 has a thickness of at least 0.05 µm.

Figure 3:
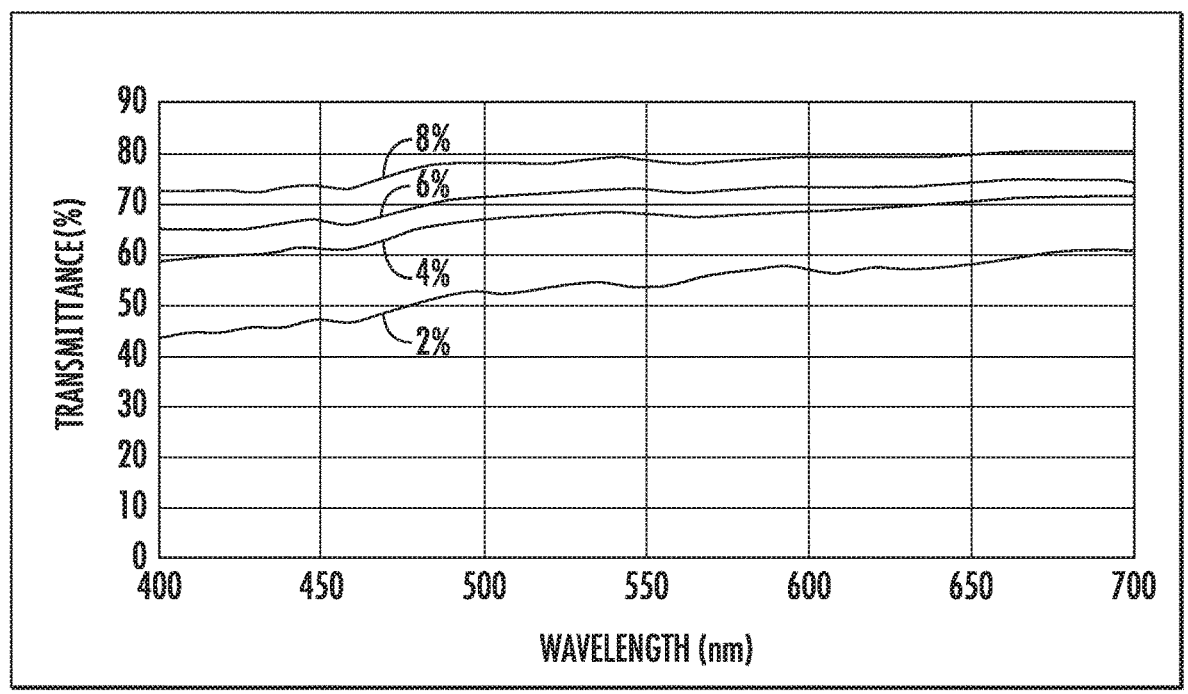
FIG. 3 is a graph of the transmittance for various dilutions of the black in layer, according to an exemplary embodiment.

Further, the ink of the black ink layer 122 is selected and printed in such a way that the black ink layer 122 is neutral density (i.e., has no color). With respect to the CIE L*a*b* color space, a* and b* are no more than 5 for the black ink layer 122. In embodiments, a* and b* are no more than 2, and in still other embodiments, a* and b* are no more than 1. In particular embodiments, a* and b* are 0. In embodiments, L* is less than 50. In other embodiments, L* is less than 30, and in still other embodiments, L* is less than 20. In embodiments, the black ink layer 122 comprises dyes and/or pigments, such as carbon black. Further, in embodiments, the black ink layer 122 is CMYK composite black (i.e., a mixture of cyan, magenta, and yellow ink). In other embodiments, the black ink layer 122 is a CMYK rich black (i.e., a mixture of cyan, magenta, yellow, and black ink). In still other embodiments, the black ink layer 122 is printed using just K (black) ink or LK (light black) ink according to CMYK. In embodiments, the transmittance of the black ink layer 122 is controlled by diluting the ink with solvent. Specifically, a more dilute ink will produce a black ink layer 122 having a higher transmittance that a less dilute ink. FIG. 3 provides a graph of the transmittance for four inks that have been diluted with 2%, 4%, 6%, and 8% (by volume) with a solvent. As can be seen in FIG. 3, the 2% diluted ink had the lowest transmittance in the visible spectrum, and the 8% diluted ink had the highest transmittance in the visible spectrum. Thus, for example, the 2% diluted ink could be used to provide a deadfront effect, whereas the 8% diluted ink could be used to provide a color matching effect.

Figure 4:
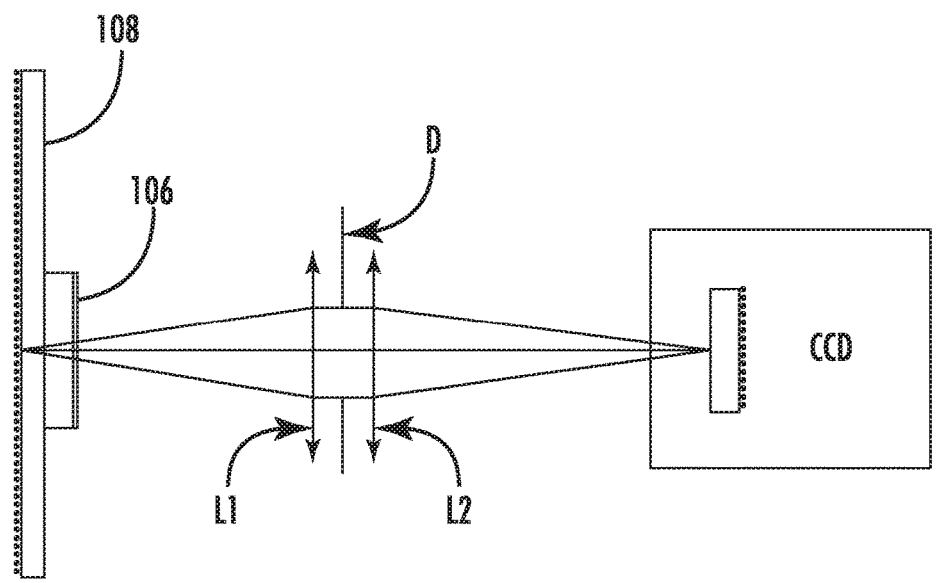
FIG. 4 depicts an experimental setup for measuring the pixel power deviation reference (PPDr), according to an exemplary embodiment.

Additionally, printing at higher ink volumes (i.e., less diluted) reduced the observable sparkle of the decorated glass 106. FIG. 4 depicts an experimental setup to measure sparkle of the decorated glass 106 via PPDr. The image system comprises a high-resolution CCD camera, imaging lenses L1 and L2, and a diaphragm D. The imaging lenses L1, L2 are chosen to achieve the desired ratio of CCD camera pixels to source (i.e., display unit 108) pixels. The diaphragm D is set to simulate the collection angle of the human eye, e.g., about 12 mrad to 18 mrad. A pixel power deviation (PPD) was calculated for a reference transparent substrate without black ink layer 122, which then served as the reference to the PPDr for the decorated glass 106 having the black ink layer 122 printed thereon. A sparkle value was calculated for each of the decorated glasses 106 shown in FIG. 3. Going from least diluted to most diluted, the sparkle measures were 1.06%, 1.30%, 2.07%, and 1.96%. In general, Applicant found that the sparkle measurements were lowest for the least diluted inks. In embodiments, the ink used to print the ink layer 124 is diluted by no more than 10% by volume with a solvent. Further, in embodiments, the sparkle of the decorated glass 106 is no more than 2% as measured via PPDr. In other embodiments, the sparkle of the decorated glass 106 is no more than 1.5%, and in still other embodiments, the sparkle of the decorated glass 106 is no more than 1.25%.

As discussed above, the decorated glass 106 may also include an opaque mask layer 124, especially when used as a cover glass. The opaque mask layer 124 transmits less than 5% of incident light. In particular, the opaque mask layer 124 transmits less than 0.5% of incident light. In this way, the opaque mask layer 124 blocks visibility of any components beneath the decorated glass 106 in the non-display regions 132. For example, the opaque mask layer 124 may be used to block visibility of connections to the display unit 108 below the decorated glass 106, a border of the display unit 108, circuitry, etc. In embodiments, the opaque mask layer 124 is selected to have an optical density of at least 3. The opaque mask layer 124 may be applied using screen printing, inject printing, spin coating, and various lithographic techniques, among others. In embodiments, the opaque mask layer 124 has a thickness of from 1 µm to 20 µm. In embodiments, the opaque mask layer 124 is selected to be gray or black in color; however, other colors are also possible depending on the need to match any other colors in the decorated glass 106.

Additionally, as depicted in FIG. 1, the decorated glass 106 can include a surface treatment 134 on one or both of the first major surface 126 and the second major surface 128. The surface treatment 106 can be provided through addition or removal of material from the first or second major surface 126, 128. For example, the surface treatment 134 can be applied by coating the first or second major surface 126, 128. In another example, the surface treatment 134 can be a removal of material from the first or second major surface 126, 128 such as through etching. Exemplary surface treatments include anti-fingerprint, anti-reflection, and anti-glare. In an embodiment, one or both of the anti-fingerprint and anti-reflection treatments are applied to the second major surface 128, and the anti-glare treatment is applied to the first major surface 128.

Embodiments of the decorated glass 106 disclosed herein provide several advantages. For example, as compared to decorated glasses that utilize a film to provide color matching or deadfronting, the decorated glass 106 is easily tunable to different transmittances, e.g., by changing the dilution of the ink or the thickness of the ink layer. Additionally, as compared to conventional films, the decorated glass 106 having the black ink layer 122 does not exhibit any internal reflectance that contributes to sparkle. Indeed, conventional films often include multiple layers, and incident light can reflect off of these layers and contribute to a higher overall sparkle. The black ink layer 122 has no internal layers. Further, the black ink layer 122 is thinner than conventional films, providing a thinner decorated glass 106.

Further, the decorated glass 106 having the printed black ink layer 122 provides design flexibility. In particular, displays vary between systems, and each display has a particular internal reflectance. Because of the ease by which the transmittance of the black ink layer 122 can be tuned by varying the solvent content, the variance in internal reflectance can quickly and economically be accommodated to provide the desired deadfronting or color matching effect.

Referring to FIGS. 5-9, various sizes, shapes, curvatures, glass materials, etc. for a decorated glass 106 along with various processes for forming a curved decorated glass are shown and described. It should be understood, that while FIGS. 5-9 are described in the context of a simplified curved decorated glass 2000 for ease of explanation, the decorated glass 2000 may be any of the decorated glass embodiments discussed herein.

Figure 5:
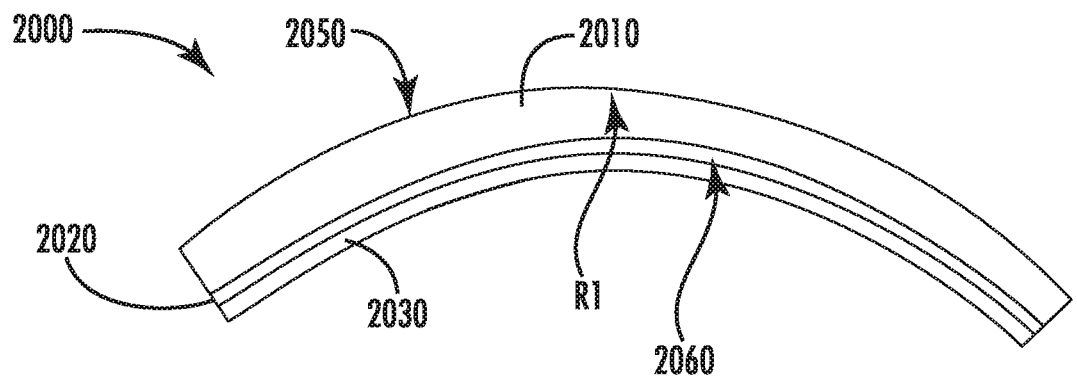
FIG. 5 is a side view of a curved deadfront for use with a display, according to an exemplary embodiment.

As shown in FIG. 5, in one or more embodiments, decorated glass 2000 includes a curved outer glass layer 2010 (e.g., substrate 120) having at least a first radius of curvature, R1, and in various embodiments, curved outer glass layer 2010 is a complex curved sheet of glass material having at least one additional radius of curvature. In various embodiments, R1 is in a range from about 60 mm to about 1500 mm.

Curved decorated glass 2000 includes a polymer layer 2020 located along an inner, major surface of curved outer glass layer 2010. Curved decorated glass 2000 also includes a frame 2030 (which may be a metal, plastic, glass, or ceramic material). Still further, curved decorated glass 2000 may also include any of the other layers described above, such as the surface treatment, the opaque mask layer, and an optically clear adhesive to attach a display unit 108 (as shown in FIG. 1) to the decorated glass 2000. Additionally, curved decorated glass 2000 may include such layers as, e.g., light guide layers, reflector layers, display module(s), display stack layers, light sources, etc. that otherwise may be associated with an electronic device as discussed herein.

As will be discussed in more detail below, in various embodiments, curved decorated glass 2000, including glass layer 2010, polymer layer 2020, frame 2030, and any other optional layers may be cold-formed together to a curved shape, as shown in FIG. 5. In other embodiments, glass layer 2010 may be formed to a curved shape, and then layers 2020 and 2030 are applied following curve formation.

Figure 6:
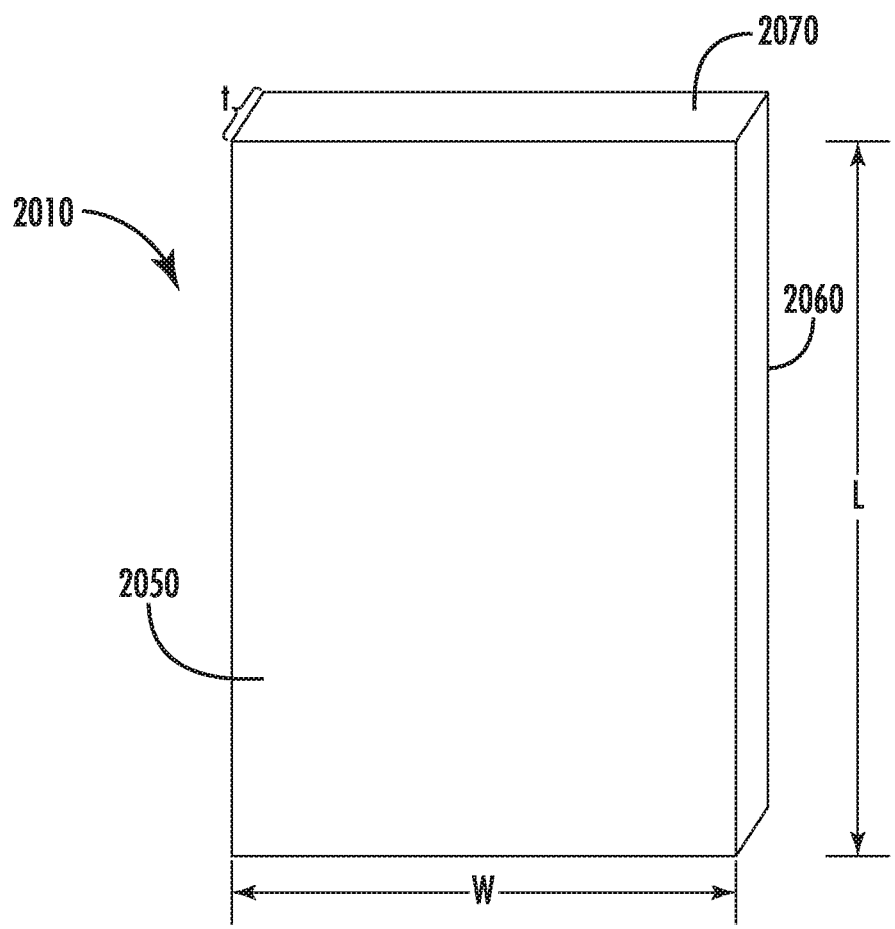
FIG. 6 is a front perspective view of a decorated glass of FIG. 5 prior to curve formation, according to an exemplary embodiment.

Referring to FIG. 6, outer glass layer 2010 is shown prior to being formed to the curved shape shown in FIG. 6. In general, Applicant believes that the articles and processes discussed herein provide high quality decorated glass structures utilizing glass of sizes, shapes, compositions, strengths, etc. not previously provided.

As shown in FIG. 6, glass layer 2010 includes a first major surface 2050 and a second major surface 2060 opposite first major surface 2050. An edge surface or minor surface 2070 connects the first major surface 2050 and the second major surface 2060. Glass layer 2010 has a thickness (t) that is substantially constant and is defined as a distance between the first major surface 2050 and the second major surface 2060. In some embodiments, the thickness (t) as used herein refers to the maximum thickness of the glass layer 2010. Glass layer 2010 includes a width (W) defined as a first maximum dimension of one of the first or second major surfaces orthogonal to the thickness (t), and outer glass layer 2010 also includes a length (L) defined as a second maximum dimension of one of the first or second surfaces orthogonal to both the thickness and the width. In other embodiments, the dimensions discussed herein are average dimensions.

In one or more embodiments, glass layer 2010 has a thickness (t) that is in a range from 0.05 mm to 2 mm. In various embodiments, glass layer 2010 has a thickness (t) that is about 1.5 mm or less. For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, glass layer 2010 has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, glass layer 2010 has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm.

As shown in FIG. 5, glass layer 2010 is shaped to a curved shaping having at least one radius of curvature, shown as R1. In various embodiments, glass layer 2010 may be shaped to the curved shape via any suitable process, including cold-forming and hot-forming.

In specific embodiments, glass layer 2010 is shaped to the curved shape shown in FIG. 5, either alone, or following attachment of layers 2020 and 2030, via a cold-forming process. As used herein, the terms "cold-bent," "cold-bending," "cold-formed" or "cold-forming" refers to curving the glass decorated glass at a cold-form temperature which is less than the softening point of the glass (as described herein). A feature of a cold-formed glass layer is an asymmetric surface compressive between the first major surface 2050 and the second major surface 2060. In some embodiments, prior to the cold-forming process or being cold-formed, the respective compressive stresses in the first major surface 2050 and the second major surface 2060 are substantially equal.

In some such embodiments in which glass layer 2010 is unstrengthened, the first major surface 2050 and the second major surface 2060 exhibit no appreciable compressive stress, prior to cold-forming. In some such embodiments in which glass layer 2010 is strengthened (as described herein), the first major surface 2050 and the second major surface 2060 exhibit substantially equal compressive stress with respect to one another, prior to cold-forming. In one or more embodiments, after cold-forming the compressive stress on the second major surface 2060 (e.g., the concave surface following bending) increases (i.e., the compressive stress on the second major surface 2050 is greater after cold-forming than before cold-forming).

Without being bound by theory, the cold-forming process increases the compressive stress of the glass article being shaped to compensate for tensile stresses imparted during bending and/or forming operations. In one or more embodiments, the cold-forming process causes the second major surface 2060 to experience compressive stresses, while the first major surface 2050 (e.g., the convex surface following bending) experiences tensile stresses. The tensile stress experienced by surface 2050 following bending results in a net decrease in surface compressive stress, such that the compressive stress in surface 2050 of a strengthened glass sheet following bending is less than the compressive stress in surface 2050 when the glass sheet is flat.

Further, when a strengthened glass sheet is utilized for glass layer 2010, the first major surface and the second major surface (2050, 2060) are already under compressive stress, and thus first major surface 2050 can experience greater tensile stress during bending without risking fracture. This allows for the strengthened embodiments of glass layer 2010 to conform to more tightly curved surfaces (e.g., shaped to have smaller R1 values).

In various embodiments, the thickness of glass layer 2010 is tailored to allow glass layer 2010 to be more flexible to achieve the desired radius of curvature. Moreover, a thinner glass layer 2010 may deform more readily, which could potentially compensate for shape mismatches and gaps that may be created by the shape of a support or frame (as discussed below). In one or more embodiments, a thin and strengthened glass layer 2010 exhibits greater flexibility especially during cold-forming. The greater flexibility of the glass articles discussed herein may allow for consistent bend formation without heating.

In various embodiments, glass layer 2010 (and consequently decorated glass 2000) may have a compound curve including a major radius and a cross curvature. A complexly curved cold-formed glass layer 2010 may have a distinct radius of curvature in two independent directions. According to one or more embodiments, the complexly curved cold-formed glass layer 2010 may thus be characterized as having "cross curvature," where the cold-formed glass layer 2010 is curved along an axis (i.e., a first axis) that is parallel to a given dimension and also curved along an axis (i.e., a second axis) that is perpendicular to the same dimension. The curvature of the cold-formed glass layer 2010 can be even more complex when a significant minimum radius is combined with a significant cross curvature, and/or depth of bend.

Figure 7:
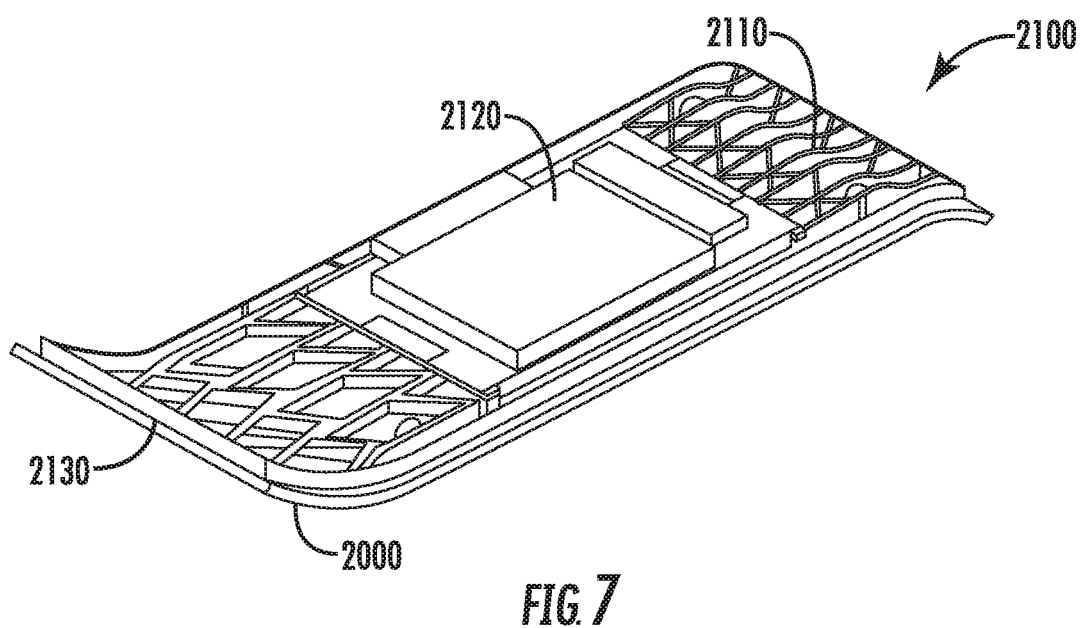
FIG. 7 shows a curved decorated glass shaped to conform to a curved display frame, according to an exemplary embodiment.

Referring to FIG. 7, display assembly 2100 is shown according to an exemplary embodiment. In the embodiment shown, display assembly 2100 includes frame 2110 supporting (either directly or indirectly) both a light source, shown as a display unit 2120, and decorated glass 2000. As shown in FIG. 7, decorated glass 2000 and display unit 2120 are coupled to frame 2110, and display module 2120 is positioned to allow a user to view light, images, etc. generated by display unit 2120 through the decorated glass 2000. In various embodiments, frame 2110 may be formed from a variety of materials such as plastic (PC/ABS, etc.), metals (Al-alloys, Mg-alloys, Fe-alloys, etc.), glass, or ceramic. Various processes such as casting, machining, stamping, injection molding, etc. may be utilized to form the curved shape of frame 2110. While frame 2110 is shown as a frame associated with a display assembly, frame 2110 may be any support or frame structure associated with a vehicle interior system.

In various embodiments, the systems and methods described herein allow for formation of decorated glass 2000 to conform to a wide variety of curved shapes that frame 2110 may have. As shown in FIG. 7, frame 2110 has a support surface 2130 that has a curved shape, and decorated glass structure 2000 is shaped to match the curved shape of support surface 2130. As will be understood, decorated glass structure 2000 may be shaped into a wide variety of shapes to conform to a desired frame shape of a display assembly 2100, which in turn may be shaped to fit the shape of a portion of a vehicle interior system, as discussed herein.

In one or more embodiments, decorated glass 2000 (and specifically glass layer 2010) is shaped to have a first radius of curvature, R1, of about 60 mm or greater. For example, R1 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, support surface 2130 has a second radius of curvature of about 60 mm or greater. For example, the second radius of curvature of support surface 2130 may be in a range from about 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 9500 mm to about 1500 mm, from about 1000 mm to about 1500 mm, from about 1250 mm to about 1500 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm.

In one or more embodiments, decorated glass 2000 is cold-formed to exhibit a first radius curvature, R1, that is within 10% (e.g., about 10% or less, about 9% or less, about 8% or less, about 7% or less, about 6% or less, or about 5% or less) of the second radius of curvature of support surface 2130 of frame 2110. For example, support surface 2130 of frame 2110 exhibits a radius of curvature of 1000 mm, decorated glass 2000 is cold-formed to have a radius of curvature in a range from about 900 mm to about 1100 mm.

In one or more embodiments, first major surface 2050 and/or second major surface 2060 of glass layer 2010 includes a surface treatment or a functional coating. The surface treatment may cover at least a portion of first major surface 2050 and/or second major surface 2060. Exemplary surface treatments include at least one of a glare reduction coating, an anti-glare coating, a scratch resistance coating, an anti-reflection coating, a half-mirror coating, or easy-to-clean coating.

Figure 8:
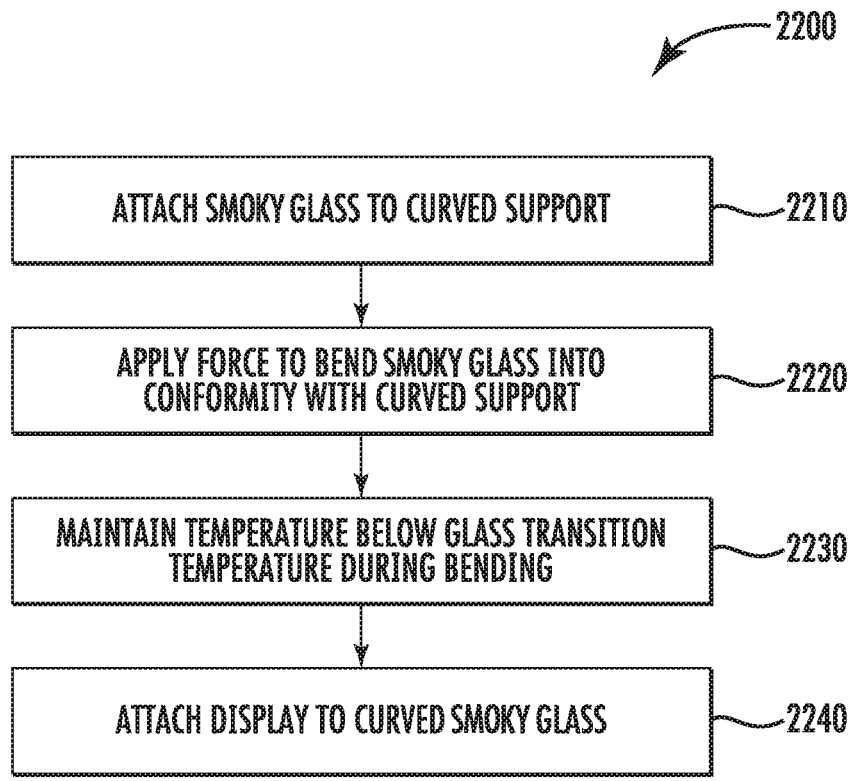
FIG. 8 shows a process for cold forming a decorated glass to a curved shape, according to an exemplary embodiment.

Referring to FIG. 8, a method 2200 for forming a display assembly 2100 (as shown in FIG. 7) that includes a cold-formed decorated glass structure, such as decorated glass 2000, is shown. At step 2210, a decorated glass structure, such decorated glass 2000, is supported and/or placed on a curved support. In general, the curved support may be a frame of a display, such as frame 2110, that defines a perimeter and curved shape of a vehicle display. In general, the curved frame includes a curved support surface, and one of the major surfaces 2050 and 2060 of decorated glass 2000 is placed into contact with the curved support surface 2130.

At step 2220, a force is applied to the decorated glass structure while it is supported by the support causing the decorated glass structure to bend into conformity with the curved shape of the support. In this manner, a curved decorated glass structure 2000, as shown in FIG. 5, is formed from a generally flat decorated glass structure. In this arrangement, curving the flat decorated glass forms a curve shape on the major surface facing the support, while also causing a corresponding (but complimentary) curve to form in the major surface opposite of the frame. Applicant believes that by bending the decorated glass structure directly on the curved frame, the need for a separate curved die or mold (typically needed in other glass bending processes) is eliminated. Further, Applicant believes that by shaping the decorated glass directly to the curved frame, a wide range of curved radii may be achieved in a low complexity manufacturing process.

In some embodiments, the force applied in step 2220 may be air pressure applied via a vacuum fixture. In some other embodiments, the air pressure differential is formed by applying a vacuum to an airtight enclosure surrounding the frame and the decorated glass structure. In specific embodiments, the airtight enclosure is a flexible polymer shell, such as a plastic bag or pouch. In other embodiments, the air pressure differential is formed by generating increased air pressure around the decorated glass and the frame with an overpressure device, such as an autoclave. Applicant has further found that air pressure provides a consistent and highly uniform bending force (as compared to a contact-based bending method) which further leads to a robust manufacturing process. In various embodiments, the air pressure differential is between 0.5 and 1.5 atmospheres of pressure (atm), specifically between 0.7 and 1.1 atm, and more specifically is 0.8 to 1 atm.

At step 2230, the temperature of the decorated glass structure is maintained below the glass transition temperature of the material of the outer glass layer during the bending. As such, method 2200 is a cold-forming or cold-bending process. In particular embodiments, the temperature of the decorated glass structure is maintained below 500° C., 400° C., 300° C., 200° C., or 100° C. In a particular embodiment, the decorated glass is maintained at or below room temperature during bending. In a particular embodiment, the decorated glass is not actively heated via a heating element, furnace, oven, etc. during bending, as is the case when hot-forming glass to a curved shape.

As noted above, in addition to providing processing advantages such as eliminating expensive and/or slow heating steps, the cold-forming processes discussed herein are believed to generate curved decorated glasses with a variety of properties that are believed to be superior to those achievable via hot-forming processes. For example, Applicant believes that, for at least some glass materials, heating during hot-forming processes decreases optical properties of curved glass sheets, and thus, the curved decorated glasses formed utilizing the cold-bending processes/systems discussed herein provide for both curved glass shape along with improved optical qualities not believed achievable with hot-bending processes.

Further, many glass coating materials (e.g., anti-glare coatings, anti-reflective coatings, etc.) are applied via deposition processes, such as sputtering processes, that are typically ill-suited for coating on to a curved surface. In addition, many coating materials, such as the polymer layer, also are not able to survive the high temperatures associated with hot-bending processes. Thus, in particular embodiments discussed herein, layer 2020 is applied to glass layer 2010 prior to cold-bending. Thus, Applicant believes that the processes and systems discussed herein allow for bending of glass after one or more coating material has been applied to the glass, in contrast to typical hot-forming processes.

At step 2240, the curved decorated glass is attached or affixed to the curved support. In various embodiments, the attachment between the curved decorated glass structure and the curved support may be accomplished via an adhesive material. Such adhesives may include any suitable optically clear adhesive for bonding the decorated glass structure in place relative to the display assembly (e.g., to the frame of the display). In one example, the adhesive may include an optically clear adhesive available from 3M Corporation under the trade name 8215. The thickness of the adhesive may be in a range from about 200 µm to about 500 µm.

The adhesive material may be applied in a variety ways. In one embodiment, the adhesive is applied using an applicator gun and made uniform using a roller or a draw down die. In various embodiments, the adhesives discussed herein are structural adhesives. In particular embodiments, the structural adhesives may include an adhesive selected from one or more of the categories: (a) Toughened Epoxy (Masterbond EP21TDCHT-LO, 3M Scotch Weld Epoxy DP460 Off-white); (b) Flexible Epoxy (Masterbond EP21TDC-2LO, 3M Scotch Weld Epoxy 2216 B/A Gray); (c) Acrylic (LORD Adhesive 410/Accelerator 19 w/LORD AP 134 primer, LORD Adhesive 852/LORD Accelerator 25GB, Loctite HF8000, Loctite AA4800); (d) Urethanes (3M Scotch Weld Urethane DP640 Brown); and (e) Silicones (Dow Corning 995). In some cases, structural glues available in sheet format (such as B-staged epoxy adhesives) may be utilized. Furthermore, pressure sensitive structural adhesives such as 3M VHB tapes may be utilized. In such embodiments, utilizing a pressure sensitive adhesive allows for the curved decorated glass to be bonded to the frame without the need for a curing step.

Figure 9:
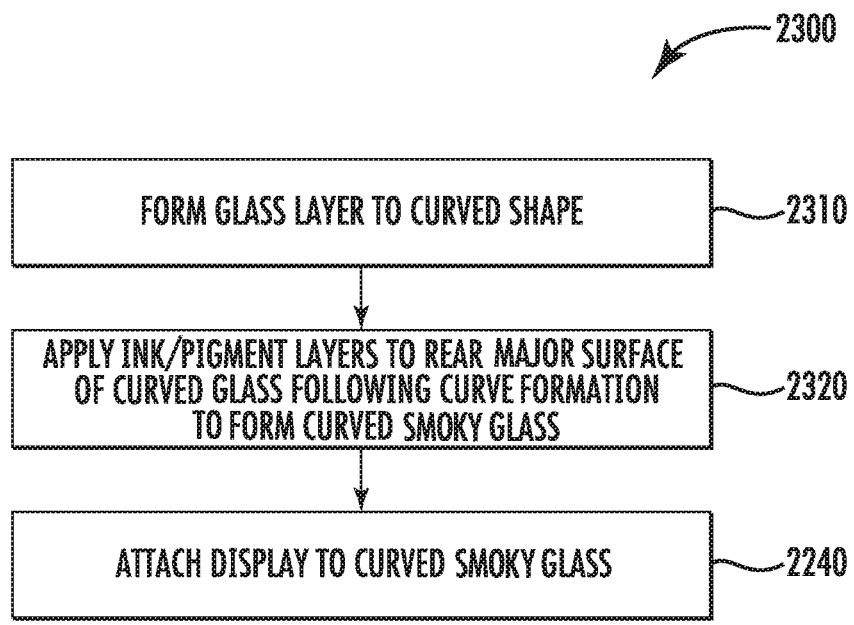
FIG. 9 shows a process for forming a curved decorated glass utilizing a curved glass layer, according to an exemplary embodiment.

Referring to FIG. 9, another method 2300 for forming a display utilizing a curved decorated glass structure is shown and described. In some embodiments, the glass layer (e.g., glass layer 2010) of a decorated glass is formed to curved shape at step 2310. Shaping at step 2310 may be either cold-forming or hot-forming. At step 2320, the decorated glass ink/pigment layers and any of the other optional layers are applied to the glass layer following shaping. Next at step 2330, the curved decorated glass is attached to a frame, such as frame 2110 of display assembly 2100, or other frame that may be associated with a vehicle interior system.

Glass Materials

The various glass layer(s) of the decorated glass discussed herein, such as glass layer 2010, may be formed from any suitable glass composition including soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, glass layer(s) herein are described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO. In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Strengthened Glass Properties

In one or more embodiments, glass layer 2010 or other glass layer of any of the decorated glass embodiments discussed herein may be formed from a strengthened glass sheet or article. In one or more embodiments, the glass articles used to form the layer(s) of the decorated glass structures discussed herein may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, the glass articles used to form the layer(s) of the decorated glass structures discussed herein may be strengthened mechanically by utilizing a mismatch of the coefficient of thermal expansion between portions of the glass to create a compressive stress region and a central region exhibiting a tensile stress. In some embodiments, the glass article may be strengthened thermally by heating the glass to a temperature above the glass transition point and then rapidly quenching.

In one or more embodiments, the glass articles used to form the layer(s) of the decorated glass structures discussed herein may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in a molten salt bath (or two or more molten salt baths) containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass layer(s) of a decorated glass structure (including the structure of the article and any crystalline phases present) and the desired DOC and CS of the glass layer(s) of a decorated glass structure that results from strengthening.

Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on the glass thickness, bath temperature and glass (or monovalent ion) diffusivity. However, temperatures and immersion times different from those described above may also be used.

In one or more embodiments, the glass articles used to form the layer(s) of the decorated glass may be immersed in a molten salt bath of 100% $NaNO_3$, 100% $KNO_3$, or a combination of $NaNO_3$ and $KNO_3$ having a temperature from about 370° C. to about 480° C. In some embodiments, the glass layer(s) of a decorated glass may be immersed in a molten mixed salt bath including from about 5% to about 90% $KNO_3$ and from about 10% to about 95% $NaNO_3$. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass articles used to form the layer(s) of the decorated glass structures may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass layer(s) of a decorated glass structure. The spike may result in a greater surface CS value. This spike can be achieved by single bath or multiple baths, with the bath(s) having a single composition or mixed composition, due to the unique properties of the glass compositions used in the glass layer(s) of a decorated glass structure described herein.

In one or more embodiments, where more than one monovalent ion is exchanged into the glass articles used to form the layer(s) of the decorated glass structures, the different monovalent ions may exchange to different depths within the glass layer (and generate different magnitudes stresses within the glass article at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass article. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass article is chemically strengthened by an ion exchange treatment, FSM or SCALP may be used depending on which ion is exchanged into the glass article. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM. Central tension or CT is the maximum tensile stress and is measured by SCALP.

In one or more embodiments, the glass articles used to form the layer(s) of the decorated glass structures may be strengthened to exhibit a DOC that is described a fraction of the thickness t of the glass article (as described herein). For example, in one or more embodiments, the DOC may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOC may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the glass articles used to form the layer(s) of the decorated glass structures may have a CS (which may be found at the surface or a depth within the glass article) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the glass articles used to form the layer(s) of the decorated glass structures may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A decorated glass, comprising:
a transparent substrate having a first major surface and a second major surface, the second major surface being opposite the first major surface; and
a black ink layer disposed on the second major surface in a display region, the black ink layer having a transmission coefficient of between 0.2 and 0.85 with respect to incident light having a wavelength of 400 nm to 700 nm;
wherein the decorated glass has 2% or less of sparkle when measured from the first major surface via pixel power deviation reference (PPDr).

2. The decorated glass of claim 1, wherein the transparent substrate comprises at least one of soda lime glass, aluminosilicate glass, borosilicate glass, boroaluminosilicate glass, alkali-containing aluminosilicate glass, alkali-containing borosilicate glass, or alkali-containing boroaluminosilicate glass.

3. The decorated glass of claim 1, wherein the black ink layer has a thickness of at least 0.05 μm and no more than 50 μm.

4. The decorated glass of claim 1, wherein the black ink layer comprises K ink or LK ink from the CMYK color model.

5. The decorated glass of claim 1, wherein the black ink layer comprises CMYK composite black ink according to the CMYK color model.

6. The decorated glass of claim 1, wherein the black ink layer comprises CMYK rich black.

7. The decorated glass of claim 1, further comprising an opaque mask layer, the opaque mask layer defining at least one non-display region in which the decorated glass transmits at most 5% of incident light.

8. The decorated glass of claim 7, wherein the opaque mask layer is disposed between the second major surface and the black ink layer.

9. The decorated glass of claim 7, wherein the black ink layer is disposed between the second major surface and the opaque mask layer.

10. The decorated glass of claim 1, wherein the ink layer has a transmission coefficient of 0.5 to 0.85 with respect to the incident light having a wavelength of 400 nm to 700 nm and wherein the black ink layer provides a color matching effect when the decorated glass is placed over a light source.

11. The decorated glass of claim 1, wherein the ink layer has a transmission coefficient of 0.2 to 0.7 with respect to the incident light having a wavelength of 400 nm to 700 nm and wherein the black ink layer provides a deadfronting effect when the decorated glass is placed over a light source.

12. A device, comprising:
a decorated glass having a first side and a second side, the second side being opposite the first side, the decorated glass comprising:
 a transparent substrate having a first major surface and a second major surface, the second major surface being opposite the first major surface; and
 a black ink layer disposed on the second major surface in at least one display region, wherein the ink layer has a transmission coefficient of between 0.2 and 0.85 with respect to incident light having a wavelength of 400 nm to 700 nm; and
a light source disposed on the second side of the decorated glass;
wherein 2% or less of sparkle is measured from the first side of the decorated glass via pixel power deviation reference (PPDr).

13. The device according to claim 12, wherein the light source is at least one of a light emitting diode (LED) display, an organic LED (OLED) display, a liquid crystal display (LCD), or a plasma display.

14. The device according to claim 12, wherein the transparent substrate comprises at least one of soda lime glass, aluminosilicate glass, borosilicate glass, boroaluminosilicate glass, alkali-containing aluminosilicate glass, alkali-containing borosilicate glass, or alkali-containing boroaluminosilicate glass.

15. The device according to claim 12, wherein the black ink layer has a thickness of at least 0.05 μm and no more than 50 μm.

16. The device according to claim 12, wherein the black ink layer comprises K ink from the CMYK color model.

17. The device according to claim 12, wherein the black ink layer comprises CMYK composite black ink according to the CMYK color model.

18. The device according to claim 12, wherein the black ink layer comprised CMYK rich black according to the CMYK color model.

19. The device according to claim 12, further comprising an opaque mask layer, the opaque mask layer defining at least one non-display region in which the decorated glass transmits at most 5% of incident light.

* * * * *